US008959621B2

(12) United States Patent
Snelling et al.

(10) Patent No.: US 8,959,621 B2
(45) Date of Patent: *Feb. 17, 2015

(54) HUMAN VERIFICATION BY CONTEXTUALLY ICONIC VISUAL PUBLIC TURING TEST

(75) Inventors: David Snelling, Kirkland, WA (US); Brian Grutzius, Issaquah, WA (US); Scott Thompson, Bellevue, WA (US); Adam Fritz, Seattle, WA (US)

(73) Assignee: Disney Enterprises, Inc., Burbank, CA (US)

(*) Notice: Subject to any disclaimer, the term of this patent is extended or adjusted under 35 U.S.C. 154(b) by 992 days.

This patent is subject to a terminal disclaimer.

(21) Appl. No.: 12/661,921

(22) Filed: Mar. 26, 2010

(65) Prior Publication Data

US 2011/0150267 A1    Jun. 23, 2011

Related U.S. Application Data

(60) Provisional application No. 61/284,622, filed on Dec. 22, 2009.

(51) Int. Cl.
| | |
|---|---|
| *G06F 21/36* | (2013.01) |
| *G06Q 30/02* | (2012.01) |
| *G06F 21/31* | (2013.01) |
| *H04L 29/06* | (2006.01) |

(52) U.S. Cl.
CPC .............. *G06Q 30/02* (2013.01); *G06F 21/316* (2013.01); *G06F 21/36* (2013.01); *G06F 2221/2103* (2013.01); *G06F 2221/2115* (2013.01); *G06F 2221/2117* (2013.01); *G06F 2221/2133* (2013.01); *H04L 63/083* (2013.01)
USPC ........................................................ 726/19

(58) Field of Classification Search
CPC .................. G06F 21/316; G06F 21/36; G06F 2221/2103; G06F 2221/2115; G06F 2221/2117; G06F 2221/2133; H04L 9/3271; H04L 63/08; H04L 63/126
USPC .................................. 726/17, 19, 28; 705/44
See application file for complete search history.

(56) References Cited

U.S. PATENT DOCUMENTS

| | | | |
|---|---|---|---|
| 5,345,549 A | 9/1994 | Appel | |
| 8,732,089 B1 * | 5/2014 | Fang et al. | 705/67 |
| 2002/0187462 A1* | 12/2002 | Mariappan | 434/350 |
| 2005/0138376 A1 | 6/2005 | Fritz | |
| 2005/0266387 A1* | 12/2005 | Rossides | 434/323 |
| 2009/0012855 A1* | 1/2009 | Jamal et al. | 705/14 |
| 2010/0325706 A1* | 12/2010 | Hachey | 726/6 |

* cited by examiner

*Primary Examiner* — Linglan Edwards
*Assistant Examiner* — Kevin Bechtel
(74) *Attorney, Agent, or Firm* — Farjami & Farjami LLP

(57) ABSTRACT

There is provided a system and method for human verification by a contextually iconic visual public Turing test. There is provided a method comprising receiving a request to verify whether a client is human controlled, selecting, by contextual criteria, a plurality of images each having one or more associated tags from a database, generating a challenge question and a corresponding answer set based on associated tags of a subset of the plurality of images, presenting the plurality of images and the challenge question to the client, receiving a submission to the challenge question from the client, and responding to the request by verifying whether the submission is contained in the answer set to determine whether the client is human controlled. The contextual criteria may comprise subject matter, branding, or intended audience of a content provider sending the request, thereby facilitating human responses while deterring automated systems.

20 Claims, 4 Drawing Sheets

Fig. 1
Find Donald, Minnie and Goofy!
1
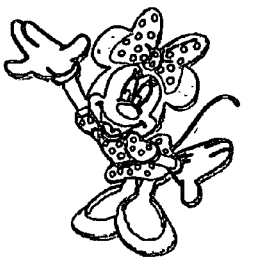
2
3
4
5
6
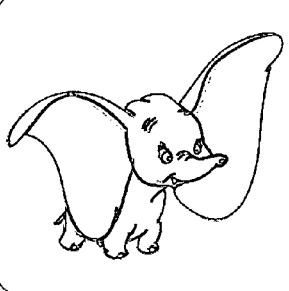
7
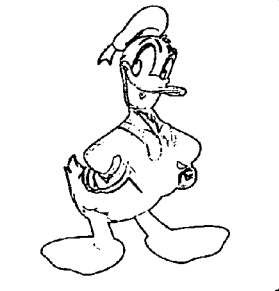
8
9
Your Answer: 128
I don't know
Submit answer

Fig. 2

| ID | Area | Group | Tags |
|---|---|---|---|
| 1 | General Characters | Disney | Goofy |
| 2 | General Characters | Disney | Minnie, Mouse, Female |
| 3 | General Characters | Disney | Pluto, Dog |
| 4 | General Characters | Disney | Snow White |
| 5 | General Characters | Disney | Mickey, Goofy, Donald, Mouse, Duck |
| 6 | General Characters | Disney | Pooh, Tigger, Piglet, Rabbit, Eeyore, Bear, Tiger, Pig, Donkey |
| 7 | General Characters | Disney | Dumbo, Elephant, Baby |
| 8 | General Characters | Disney | Donald, Duck |
| 9 | General Characters | Disney | Pinocchio, Wooden puppet |
| 10 | General Characters | Disney | Ariel, Mermaid |
| 11 | General Characters | Disney | Simba, Lion |
| 12 | Desperate Housewives | ABC | Bree, Susan, Gabriel |
| 13 | Desperate Housewives | ABC | Bree |
| 14 | Desperate Housewives | ABC | Bree, Lynette |
| 15 | Desperate Housewives | ABC | Susan |
| 16 | Desperate Housewives | ABC | Susan |
| 17 | Desperate Housewives | ABC | Susan |
| 18 | Desperate Housewives | ABC | Susan |

HUMAN VERIFICATION BY CONTEXTUALLY ICONIC VISUAL PUBLIC TURING TEST

RELATED APPLICATIONS

This application claims the priority of U.S. Provisional patent application Ser. No. 61/284,622, filed Dec. 22, 2009, which is hereby incorporated by reference.

BACKGROUND OF THE INVENTION

1. Field of the Invention

The present invention relates generally to electronic verification systems. More particularly, the present invention relates to electronic verification systems for identifying human users.

2. Background Art

Human verification systems, such as CAPTCHAs, are well known in the art. Website portals, e-commerce sites, discussion forums, social networks, online games, public databases, and other applications often employ human verification systems to prevent the use of automated systems. Often, allowing unfettered access to automated systems or "bots" poses numerous problems, such as server overloading, inequitable access to resources, vulnerability to brute force attacks, and facilitation of abusive behavior such as spamming/unsolicited advertising, vote rigging, and spreading of malware. The use of effective human verification systems to limit interactions to verified humans helps to mitigate the ill effects from the above problems.

Ideally, to provide the most effective human verification system, the verification step should be easily solved by a human yet difficult for a machine to automatically process without the aid of human intelligence. Until recently, CAPTCHAs have been effective in that ideal, but automated systems have largely caught up to CAPTCHAs by employing advanced image recognition algorithms and data mining. In response, CAPTCHAs are becoming more obfuscated and complicated to deter these advanced automated systems.

Unfortunately, these defensive measures have also made CAPTCHAs more difficult for humans to solve as well. As a result, many users, when confronted with a difficult CAPTCHA, may become discouraged and decide to give up and go elsewhere. Furthermore, the increasing use of complicated English words and phrases without any helpful context may alienate and frustrate users having limited English skills. As a result, content and service providers stand to lose valuable user uptake and market share, particularly younger users lacking sophisticated vocabularies or users in non-English speaking cultures.

Accordingly, there is a need to overcome the drawbacks and deficiencies in the art by providing a human verification system that is simple for humans to solve across diverse age groups and cultures while still providing effective deterrence against automated systems.

SUMMARY OF THE INVENTION

There are provided systems and methods for human verification by a contextually iconic visual public Turing test, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 presents a diagram of an image for administering a contextually iconic visual public Turing test for human verification, according to one embodiment of the present invention;

FIG. 2 presents a diagram of a database table for data related to a contextually iconic visual public Turing test for human verification, according to one embodiment of the present invention;

DETAILED DESCRIPTION OF THE INVENTION

Figure 3:
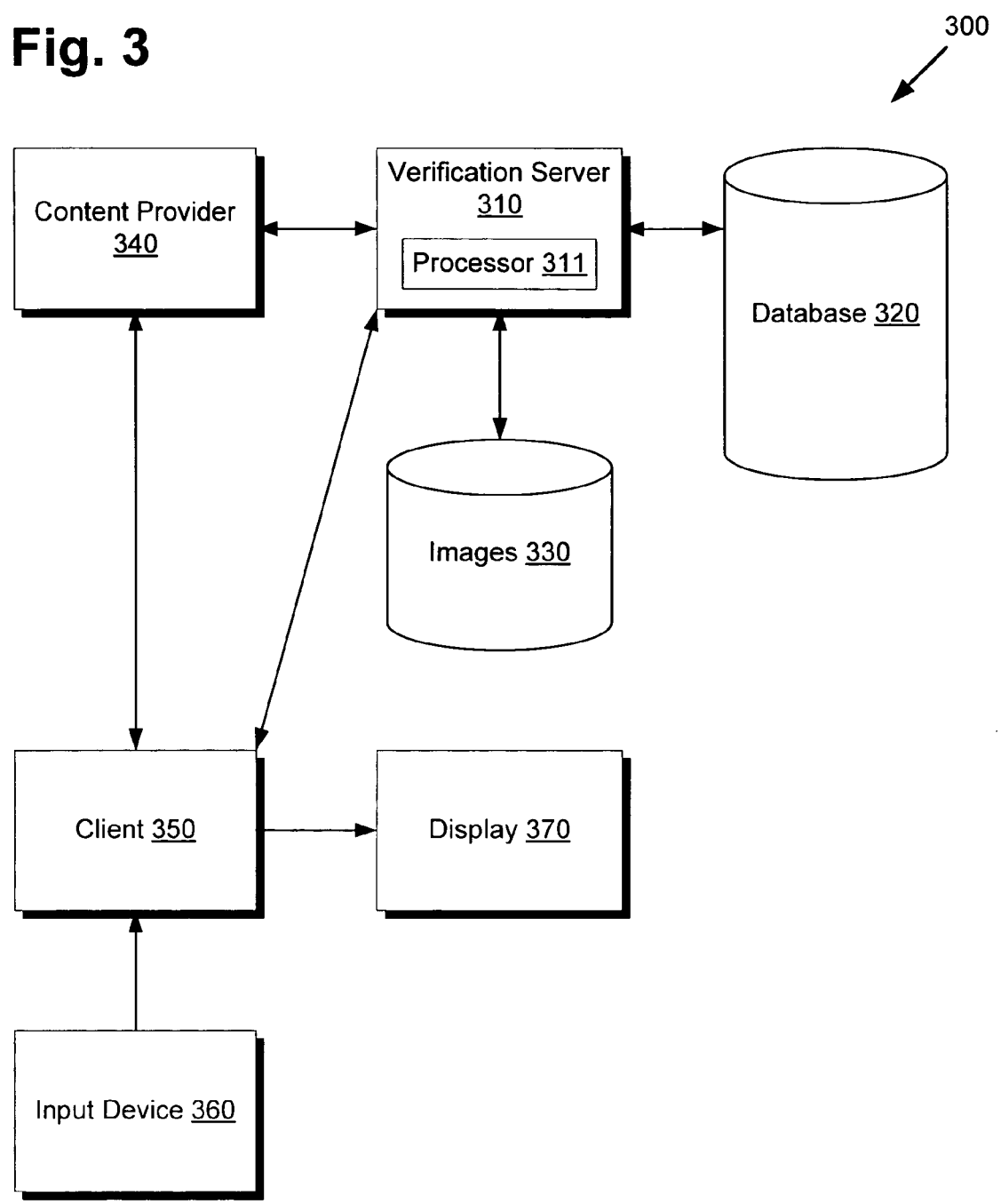
FIG. 3 presents a system diagram for administering a contextually iconic visual public Turing test for human verification, according to one embodiment of the present invention.

The present application is directed to a system and method for human verification by a contextually iconic visual public Turing test. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

FIG. 1 presents a diagram of an image for administering a contextually iconic visual public Turing test for human verification, according to one embodiment of the present invention. As shown in display 100 of FIG. 1, iconic visual images or panels are selected to match a particular context. For example, solving the puzzle shown in FIG. 1 may be presented to a user as a pre-condition for registering to an online community focused on classic Disney animation. Since the user is registering to participate in such a community, it might be reasonably assumed that the user has some familiarity with the classic Disney characters shown in display 100 of FIG. 1, allowing the user to easily recognize and select the correct answer with minimal effort.

Since the human verification puzzle can be tailored to specific contexts, users can enjoy a new game-like experience leveraging built-in audience awareness through familiar and recognizable characters and topics. Rather than struggling with arbitrary, boring, and non-contextual verification puzzles using strange words and phrases with obfuscated and difficult to read text as with conventional CAPTCHAs, users can instead select from friendly iconic visual cues sourced from familiar and well-known content providers or brands. As a result, content providers may enjoy increased user retention as users are fully engaged and may actually enjoy the verification step rather than perceiving the verification as an unrelated chore that is locking out desired content.

If the user is unfamiliar with the characters shown in display 100 of FIG. 1, the challenge question may be rephrased to use a more general or universal question. For example, the user might click on the "I don't know" button to indicate a lack of familiarity with the characters. In response, instead of asking for specific character names as shown in FIG. 1, the user may instead be asked to "Find the dog, the duck, and the elephant." Thus, the puzzle shown in FIG. 1 could also be used as a generic universal puzzle applicable to non-specific contexts as well, since the puzzle can adapt to the knowledge and content familiarity of each specific user. For example, the Disney character puzzle shown in FIG. 1 might be adopted generally for kid and family oriented websites, even those that are not directly related to classic Disney animation. In this manner, the contextually iconic visual public Turing test may be provided as a general service for third parties, relieving them of the burden of having to develop and administer a human verification system.

As shown in display 100 of FIG. 1, techniques may be employed to enhance automated systems deterrence while reducing the cognitive load for humans. For example, as shown in e.g. panels 5 and 6, individual panels may feature multiple distinct characters or objects. This feature advantageously increases the challenge for automated image recognition, which must now detect several distinct and possibly obscured objects in a particular scene. On the other hand, providing panels with multiple characters may allow additional flexibility for accommodating varied human responses. For example, while "128" is shown as a response in FIG. 1, an alternative response might instead comprise "25" or "125", since panel 5 includes both "Donald" and "Goofy". Since users may vary in their cognitive processes and puzzle solving strategies depending on age, culture, personality, or other factors, the provision of several different valid answers helps to cater to a broader range of human responses.

While the embodiment shown in display 100 of FIG. 1 allows the free selection of multiple panels before submitting an answer, alternative embodiments may use, for example, a combination lock concept. In this alternative embodiment, the user may be prompted to answer a series of questions, one after another. For example, a combination lock with three questions may successively ask the user to first find Donald, then to find Minnie, and finally to find Goofy. At the end of all three questions, the system may then inform the user whether the answers were correct or incorrect. Detailed results may be hidden to prevent the disclosure of information usable for circumvention. Additionally, a time-based limit may be enforced to prevent automated access attempts if a particular user provides several incorrect answers within a short time period.

Alternatively, rather than selecting from a grid of panels, the user may be asked to identify a specific panel directly, by typing a response or by selecting from a list of choices. For example, the user might be prompted to type the name of the character in panel 1, "Goofy", or a drop-down menu with different character names might be provided to the user, with "Goofy" provided as one of the selectable menu choices. To prevent brute-force attacks, the drop-down menu may include several incorrect alternatives.

In another embodiment, the challenge question may be posed in a completely visual or symbolic manner without requiring the user to understand any written content. This may be particularly suitable for younger audiences or non-English speaking audiences. For example, an animated tutorial may be shown to the user, demonstrating to the user that the object of the exercise is to match particular characters to specific panels. For example, rather than asking the user in a written manner to "Find Donald, Minnie, and Goofy", the challenge question may be presented as, for example, an image of Donald, an image of Minnie, and an image of Goofy, with an equals sign and a question mark or another set of universally understood symbols to indicate that the user is to match these images from the presented panels. Of course, to thwart automated systems, the images chosen for the challenge question will not be identical to those shown in the panels. To make the objective more apparent, an example puzzle may be first shown to the user, and the process of selecting a solution may be demonstrated to the user by, for example, manipulating the mouse pointer or playing back a demonstration video. Thus, universal visual cues can be used to present the challenge question, providing a friendly user interface that is not tied to an understanding of a single written language.

As shown in display 100 of FIG. 1, the panels are arranged in a user friendly three by three grid, which may be advantageously mapped to the numeric keypad of a keyboard, mobile phone, remote control, or another input device. Alternative embodiments may use any other arrangement of panels to suit a particular input device, display, or another aspect of the operating environment. For example, a server generating the puzzle shown in display 100 of FIG. 1 may detect the operating environment of the user to map a numeric keypad directly to corresponding panels for facilitated input. Thus, the user may merely key in the numbers directly to answer the puzzle. Of course, a conventional pointing device such as a mouse, a trackpad, or a touchscreen may still be supported for the selection of panels.

For accessibility, alternative non-visual verification methods may be provided as well. Conventionally, this is done by providing a spoken phrase and requiring the user to transcribe the phrase. However, the concept of the present invention may also be extended to these audio verification methods as well. For example, a recognizable actor or character voice may intone a specific phrase, and the user may be prompted to transcribe the phrase and further identify the actor or character speaking the phrase. Alternatively, the user may be prompted to provide non-written feedback, such as selecting a panel matching the actor or character speaking the phrase, thereby allowing users with limited language skills to successfully validate. Thus, as an alternative to visual iconography, contextually recognizable voiceovers also provide enhanced user engagement by leveraging built-in audience awareness and familiarity with particular character speaking styles and intonations. Moreover, the additional requirement of providing a specific character or actor name or identity may serve as effective automated systems deterrence, since sophisticated audio analysis may be required to provide a correct automated response.

Moving to FIG. 2, FIG. 2 presents a diagram of a database table for data related to a contextually iconic visual public Turing test for human verification, according to one embodiment of the present invention. Each iconic visual shown in display 100 of FIG. 1 may have one or more associated tags and may be retrieved from a database for organized access and retrieval. Each entry in database table 200 may include, for example, a unique identifier ("ID"), a path to an associated image file (not shown in FIG. 2), an associated area or topic ("Area"), a group owner ("Group"), and descriptive tags describing the visual contents of the image file ("Tags"). The "Tags" field may be implemented using one or more secondary tables, as is known in the art. The path to the image file may use obfuscation techniques, such as one-way hashing, to prevent the guessing of content from filenames or other plaintext. Additionally, the individual images may be kept hidden from end users by, for example, generating a single image file with all the selected images embedded. Furthermore, randomization of image placement, image size, filenames, and other obfuscation techniques may further serve to deter automated systems.

Besides static or still frame images, alternative embodiments may present characters or other objects in an animated fashion using, for example, HTML5, Adobe Flash, Microsoft Silverlight, Javascript, or other methods of presenting dynamic content. Animated content such as movie files, vector animation, or real-time rendered content may be more difficult for automated systems to analyze versus standard still frame content, and may also provide more appealing visuals for the user. However, for bandwidth or processor limited situations such as when working with mobile phones, still frame images may be preferred for network balancing or performance reasons.

For simplicity, panels or icons 1 through 9 in display 100 of FIG. 1 correspond directly to database entries 1 through 9 in database table 200 of FIG. 2. However, in alternative embodiments, images may be selected randomly from database table 200 using particular criteria, such as "Select nine random entries from the General Characters Area in the Disney Group", i.e. from database entries 1 through 11. Additionally, while only 18 entries are shown for simplicity in database table 200, alternative embodiments may include a sufficiently large number of entries to defeat brute force matching techniques of automated systems.

Besides the Disney characters shown in database entries 1 through 11, database entries 12 through 18 are included as well, pertaining to images associated with the ABC program "Desperate Housewives". This group of images may be contextually applied, for example, to a discussion forum for "Desperate Housewives". Since viewers of the "Desperate Housewives" program will be familiar with the characters, distinguishing the characters should be a trivial exercise for potential forum registrants, but a difficult task for automated systems. Besides animated characters or real-life actors, any arbitrary object can be used for the images linked within database table 200. Thus, another group might comprise a set of images pertaining to classic automobiles, which may be employed to verify registration to a forum for classic car enthusiasts. Database table 200 can therefore accommodate image sets for several different contexts, thereby allowing the selection of the most relevant human verification content targeted to specific user audiences or to specific subject matter or branding.

As shown in database table 200, each particular entry may include several tags that may describe some general or specific aspect of the respective referenced image. For example, the image associated with ID 2, which is labeled as panel or icon number 2 in display 100 of FIG. 1, is associated with the tags "Minnie", "Mouse", and "Female". When the question for the puzzle is being generated, any of the associated tags may be used as selection criteria. Since the tags might be implemented using a secondary table, additional attributes such as the specificity or attribute type of the tags may also be embedded within the database to aid in the formulation of a question catered to the knowledge and comfort level of different users. Thus, the user may be asked to identify the specific character "Minnie", or to find simply a "Mouse", or to find a "Female" character. As discussed above, the more specific question might be asked first, with more general questions reserved as a failsafe.

Moving to FIG. 3, FIG. 3 presents a system diagram for administering a contextually iconic visual public Turing test for human verification, according to one embodiment of the present invention. Diagram 300 of FIG. 3 includes verification server 310, database 320, images 330, content provider 340, client 350, input device 360, and display 370. Verification server 310 includes processor 311. Display 100 of FIG. 1 may correspond to display 370 in FIG. 3, and database table 200 of FIG. 2 may be contained in database 320 of FIG. 3.

Diagram 300 of FIG. 3 presents one exemplary network configuration, where a third party content provider 340 utilizes verification server 310 to verify whether accessing clients are human controlled or automated. However, alternative embodiments may combine the functions of verification server 310 and content provider 340 into a single entity. A public network, such as the Internet, may support communications links between components of diagram 300. Continuing with the examples discussed above in conjunction with FIGS. 1 and 2, content provider 340 may provide a public discussion forum targeted towards kids and families. This public discussion forum may provide features such as voting polls, message boards, social networking, and other services that may be detrimentally affected if exposed to automated systems or non-human control. For example, robots may be programmed to rig poll results by generating dummy accounts to vote multiple times, or robots may be programmed to distribute spam, malware, and other malicious content through the provided message boards and social networking features. To prevent this behavior, it is desirable to verify whether a client is human controlled or automated, and to grant access only to human controlled clients.

Thus, before providing a user account to client 350, content provider 340 should verify that client 350 is human controlled rather than an automated system or a robot. By, for example, previous mutual arrangement, content provider 340 may therefore request that verification server 310 determine whether client 350 is human controlled. As previously discussed, verification server 310 may select entries from database 320 based on a particular context of content provider 340. Since content provider 340 is servicing a kid and family friendly demographic, verification server 310 may contextually select entries from database 320 related to classic Disney animation, which may be readily recognized by the targeted demographic. As previously discussed, a selection query such as "Select nine random entries from the General Characters Area in the Disney Group" may be executed against database 320. Each of the entries may link to an image file stored in images 330, or may be directly stored within database 320.

After retrieving entries resulting from the selection query to database 320, verification server 310 may then generate a challenge question and corresponding answer set using the retrieved entries for presentation to client 350 via display 370. In alternative audio embodiments for providing accessibility, images 330 may be supplemented with audio files, and display 370 may be supplemented with an audio output device such as headphones or speakers. The user may then submit a response to the challenge question using input device 360, which may comprise a keypad, remote control, mouse, touchscreen, or any other input device. Verification server 310 may then determine whether the submission from client 350 matches against the answer set, and inform content provider 340 accordingly. Assuming a positive response, content provider 340 may then grant permission for client 350 to register for a new user account for full community participation.

Figure 4:
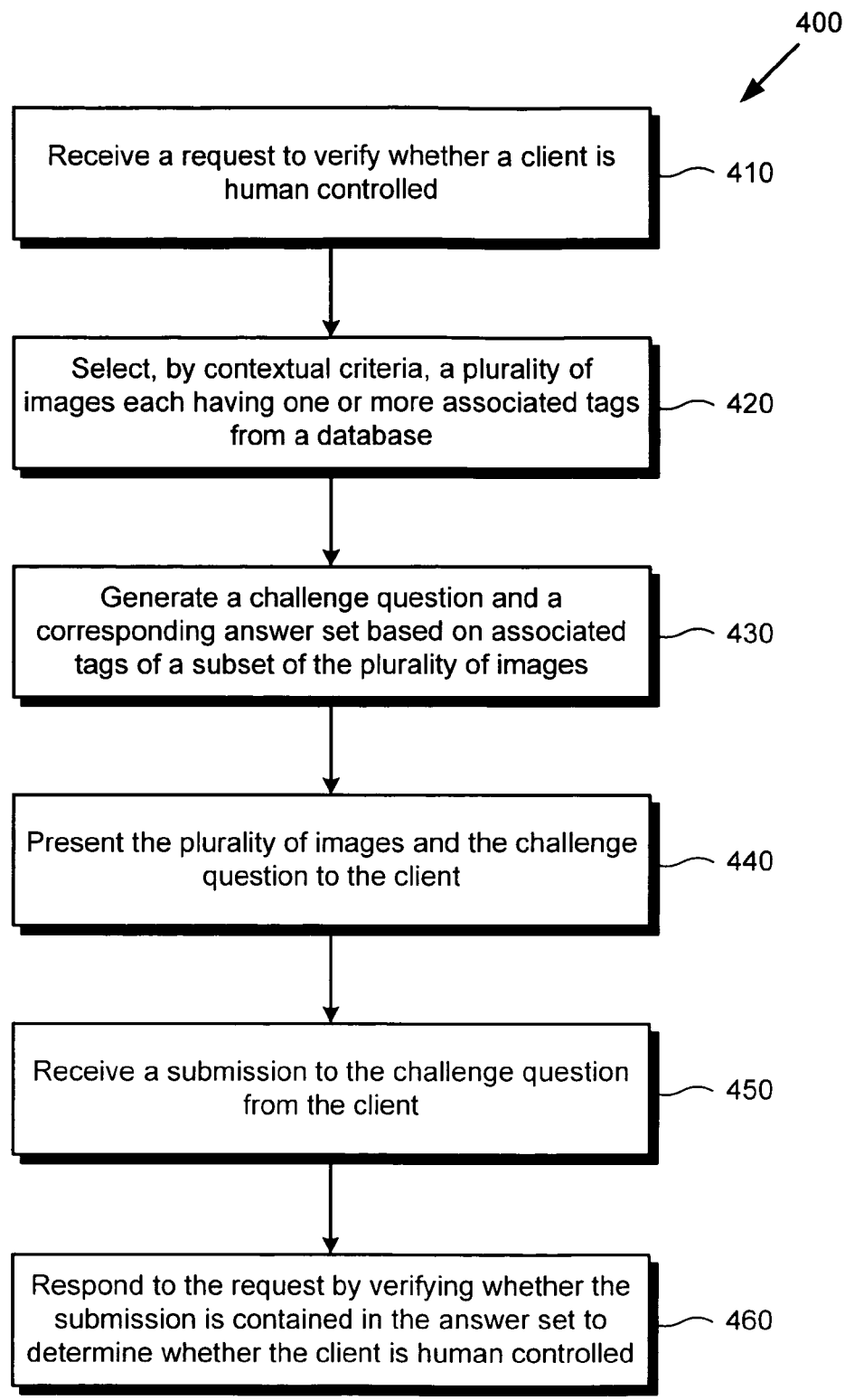
FIG. 4 shows a flowchart describing the steps, according to one embodiment of the present invention, by which a contextually iconic visual public Turing test may be administered for human verification.

Moving to FIG. 4, FIG. 4 shows a flowchart describing the steps, according to one embodiment of the present invention, by which a contextually iconic visual public Turing test may be administered for human verification. Certain details and features have been left out of flowchart 400 that are apparent to a person of ordinary skill in the art. For example, a step may comprise one or more substeps or may involve specialized equipment or materials, as known in the art. While steps 410 through 460 indicated in flowchart 400 are sufficient to describe one embodiment of the present invention, other embodiments of the invention may utilize steps different from those shown in flowchart 400.

Referring to step 410 of flowchart 400 in FIG. 4 and diagram 300 of FIG. 3, step 410 of flowchart 400 comprises processor 311 of verification server 310 receiving a request from content provider 340 to verify whether client 350 is human controlled. Continuing with the example discussed above, content provider 340 may comprise a web server providing a kids and family oriented discussion forum and community. Client 350 may access content provider 340 using a web browser over the Internet, and may express interest in registering for a new user login. Before content provider 340 allows client 350 to register as a new user, it may send a request to verification server 310 to verify whether client 350 is human controlled. In this manner, deterrence against automated systems can be provided.

Referring to step 420 of flowchart 400 in FIG. 4 and diagram 300 of FIG. 3, step 420 of flowchart 400 comprises processor 311 of verification server 310 selecting, by contextual criteria, a plurality of images each having one or more associated tags from database 320. For example, a table similar to database table 200 of FIG. 2 may be included in database 320. The entries in database table 200 may include image links (not shown) referencing image files stored in images 330 of FIG. 3. As previously discussed, the contextual criteria may include the intended audience, subject matter, or branding at content provider 340. In the present example, since the intended audience comprises kids and families, the selection may narrow the focus to the "General Characters" area of the "Disney" group. As shown in database table 200, each entry or image has one or more associated tags. Continuing with the example discussed above in conjunction with FIG. 1, step 420 may select nine database entries with corresponding images matching to ID numbers 1 through 9.

Referring to step 430 of flowchart 400 in FIG. 4 and diagram 300 of FIG. 3, step 430 of flowchart 400 comprises processor 311 of verification server 310 generating a challenge question and a corresponding answer set based on the associated tags of a subset of the plurality of images selected from step 420. For example, as previously discussed in conjunction with FIG. 1, a three by three grid of iconic visuals corresponding to the selected images from step 420 may be presented, and a question may be formulated asking a user to find one or more images from the grid matching to selected and presented tags. In the example shown in FIG. 1, the question asks the user to find three images from the three by three grid based on character name tags. As previously discussed, various alternative embodiments may also be used, such as a combination lock process, a selection from a drop-down menu, soliciting a typed or written response for identifying an image, or requiring an audio transcription of a phrase and providing the identity of the phrase speaker. Furthermore, as previously discussed, the challenge question may be crafted such that there are multiple correct solutions in the corresponding answer set. For example, some images may be associated with multiple tags, allowing them to be the correct answer for all associated tags.

Referring to step 440 of flowchart 400 in FIG. 4 and diagram 300 of FIG. 3, step 440 of flowchart 400 comprises processor 311 of verification server 310 presenting the plurality of images from step 420 and the challenge question from step 430 to client 350. Thus, display 370 connected to client 350 may show an interface similar to display 100 of FIG. 1. Alternatively, if the challenge question from step 430 is audio based, then a set of speakers or headphones connected to client 350 may instead output a spoken passage.

Referring to step 450 of flowchart 400 in FIG. 4 and diagram 300 of FIG. 3, step 450 of flowchart 400 comprises processor 311 of verification server 310 receiving a submission to the challenge question presented in step 440 from client 350. Thus, the user of client 350 may have used input device 360 to select three panels, as shown in display 100 of FIG. 1, and clicked the "Submit answer" button. Alternatively, the user may click the "I don't know" button, if provided, to restart the process at step 430 where the challenge question is formulated using more general criteria, such as asking to select specific species of animals rather than specific character names.

Referring to step 460 of flowchart 400 in FIG. 4 and diagram 300 of FIG. 3, step 460 of flowchart 400 comprises processor 311 of verification server 310 responding to the request received from step 410 by verifying whether the submission from step 450 is contained in the answer set generated in step 430 to determine whether client 350 is human controlled. In the example shown in FIG. 1, the submission of panels 1, 2, and 8 is indeed contained within the answer set, and processor 311 can report to content provider 340 that client 350 is likely human and should be granted permission for registering as a new user. Otherwise, verification server 310 may report to content provider 340 that client 350 failed to pass human verification. At this point, content provider 340 may request that verification server 310 restart the process again from step 420, to give client 350 another chance. There may be a limit enforced to the number of retries possible within a given time period to deter brute force attacks from automated systems.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for human verification comprising a contextually iconic visual public Turing test, the method comprising:

receiving a request to verify whether a client is human controlled;

selecting, by contextual criteria, a plurality of images each having one or more associated tags from a database;

generating a challenge question and a corresponding answer set based on associated tags of a subset of the plurality of images, wherein the challenge question includes an animated tutorial with visual cues;

presenting the plurality of images and the challenge question to the client;

receiving an answer to the challenge question or a rephrase indication from the client;

if receiving the answer from the client, responding to the request by verifying whether the answer is contained in the answer set to determine whether the client is human controlled;

if receiving the rephrase indication from the client, generating a rephrased challenge question having the corresponding answer set, wherein the rephrased challenge question includes the animated tutorial with the visual cues; and presenting the rephrased challenge question to the client;

wherein the challenge question is more specific than the rephrased challenge question, and wherein the rephrased challenge question is more general than the challenge question.

2. The method of claim 1, wherein the contextual criteria comprises subject matter provided by a content provider sending the request.

3. The method of claim 1, wherein the contextual criteria comprises a branding of a content provider sending the request.

4. The method of claim 1, wherein the contextual criteria comprises an intended audience of a content provider sending the request.

5. The method of claim 1 further comprising:
receiving a second answer to the rephrased challenge question from the client; and
responding to the request by verifying whether the second answer is contained in the answer set to determine whether the client is human controlled.

6. The method of claim 1, wherein the plurality of images are animated.

7. The method of claim 1, wherein the presenting of the plurality of images, the challenge question and the rephrased challenge question uses a display of the client.

8. The method of claim 1, wherein the plurality of images comprise nine images, and wherein the presenting of the plurality of images uses a three by three grid layout.

9. The method of claim 1, wherein the challenge question and the rephrased challenge question comprises selecting one or more images from the plurality of images that match one or more specific tags.

10. The method of claim 9, wherein the one or more specific tags comprises names.

11. A server for providing human verification using a contextually iconic visual public Turing test, the server comprising:
a processor configured to:
receive a request to verify whether a client is human controlled;
select, by contextual criteria, a plurality of images each having one or more associated tags from a database;
generate a challenge question and a corresponding answer set based on associated tags of a subset of the plurality of images, wherein the challenge question includes an animated tutorial with visual cues;
present the plurality of images and the challenge question to the client;
receive an answer to the challenge question or a rephrase indication from the client;
if receiving the answer from the client, respond to the request by verifying whether the answer is contained in the answer set to determine whether the client is human controlled;
if receiving the rephrase indication from the client, generate a rephrased challenge question having the corresponding answer set, wherein the rephrased challenge question includes the animated tutorial with the visual cues; and
present the rephrased challenge question to the client;
wherein the challenge question is more specific than the rephrased challenge question, and wherein the rephrased challenge question is more general than the challenge question.

12. The server of claim 11, wherein the contextual criteria comprises subject matter provided by a content provider sending the request.

13. The server of claim 11, wherein the contextual criteria comprises a branding of a content provider sending the request.

14. The server of claim 11, wherein the contextual criteria comprises an intended audience of a content provider sending the request.

15. The server of claim 11, wherein the processor is configured: to
receive a second answer to the rephrased challenge question from the client; and
respond to the request by verifying whether the second answer is contained in the answer set to determine whether the client is human controlled.

16. The server of claim 11, wherein the plurality of images are animated.

17. The server of claim 11, wherein the processor is further configured to present the plurality of images, the challenge question and the rephrased challenge question using a display of the client.

18. The server of claim 11, wherein the plurality of images comprise nine images, and wherein the processor is further configured to present the plurality of images using a three by three grid layout.

19. The server of claim 11, wherein the challenge question and the rephrased challenge question comprises selecting one or more images from the plurality of images that match one or more specific tags.

20. The server of claim 19, wherein the one or more specific tags comprises names.

* * * * *